J. W. MICHAEL.
SIGNAL DEVICE.
APPLICATION FILED AUG. 19, 1920.
1,378,367. Patented May 17, 1921.
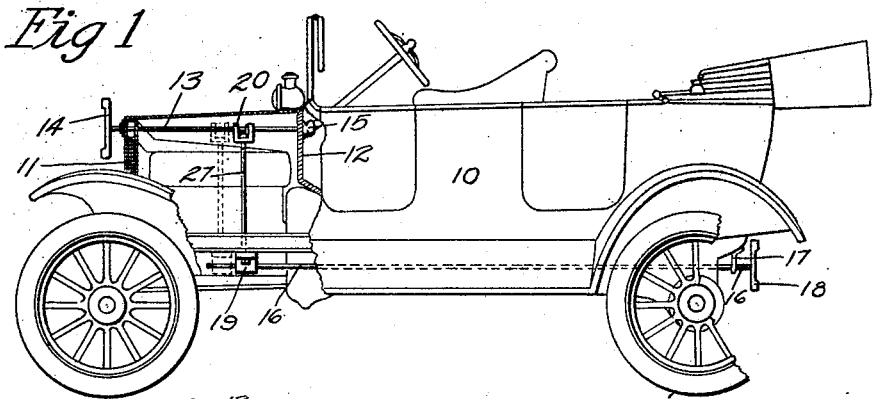
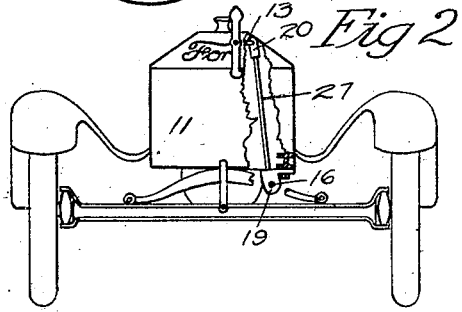
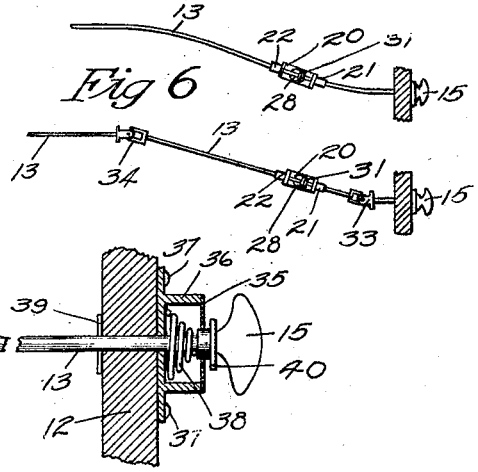
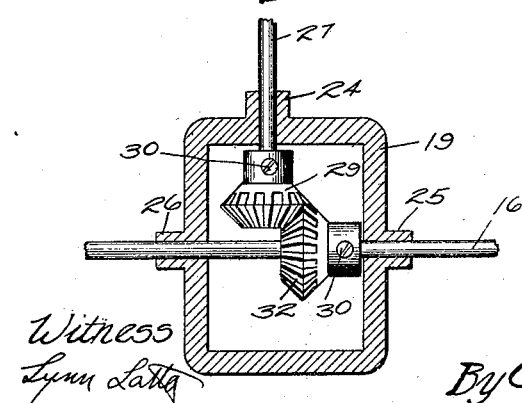
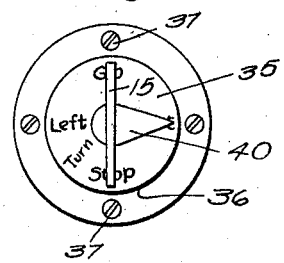
Witness
Lynn Latta
Inventor
Joseph W. Michael
By Bair & Freeman Attorneys

UNITED STATES PATENT OFFICE.

JOSEPH W. MICHAEL, OF DES MOINES, IOWA.

SIGNAL DEVICE.

1,378,367. Specification of Letters Patent. Patented May 17, 1921.

Application filed August 19, 1920. Serial No. 404,594.

*To all whom it may concern:*

Be it known that I, JOSEPH W. MICHAEL, a citizen of the United States, and a resident of Des Moines, in the county of Polk and State of Iowa, have invented a certain new and useful Signal Device, of which the following is a specification.

The object of my invention is to provide a signal device adapted to be used upon automobiles or the like, which is of simple, durable and inexpensive construction, and so arranged that without much adjustment, the parts may be made to operate upon various makes of automobiles.

More particularly it is my object to provide a signal device adapted to extend in front of and also in the rear of an automobile and to be operated by a common operating handle, the front and rear signal members being operatively connected together in such manner as to fit on various sizes of cars.

Still another object is to provide an attachment adapted to extend between the operating rods of the front and rear signal members and to be adjustably received thereon, so that the parts may be buried under various circumstances without the necessity of altering any of the mechanism.

With these and other objects in view, my invention consists in the construction, arrangement and combination of the various parts of my device, wherein the objects contemplated are attained, as hereinafter more fully set forth, pointed out in my claims, and illustrated in the accompanying drawings, in which:

Figure 1 shows a side elevation of an automobile with my improved signal device installed thereon, the parts being broken away to better illustrate the construction.

Fig. 2 shows a front elevation of an automobile, with parts also being broken away to illustrate the method of connecting the signal members.

Fig. 3 shows an enlarged, detail, sectional view of the means for operating the signal members.

Fig. 4 shows a front elevation of the common operating handle; and

Figs. 5 and 6 show detailed views.

In the accompanying drawings, I have used the reference numeral 10 to indicate an ordinary automobile, which is provided with a radiator 11, and a dash 12.

Extended through the radiator and through the dash is the operating rod 13, which is provided at its end adjacent to the radiator with a signal member 14 and on its end adjacent to the dash with the operating handle 15. A second operating rod 16 is provided substantially parallel with the first rod and adapted to have one end extend back of the car substantially, as is illustrated in Fig. 1 of the drawings.

A bracket 17 is fixed to the body of the car 10 and forms a bearing for the outer end of the operating rod 16. A signal member 18, which is similar to the signal member 14 is provided on the rear end of the operating rod 16. A bearing member 19 is fixed to the frame of the car substantially near the engine and forms a bearing for the forward end of the operating rod 16.

Slidably mounted on the operating rod 13 is the member 20, which is substantially U-shaped and is provided with the hub members 21, 22 and 23. The hub members 21 and 22 receive the rod 13. The bearing member 19 is provided with hub members 24, 25 and 26. The rod 16 extends through the hub members 25 and 26.

In order to transmit movement to the rod 16 from the rod 13, I have provided the following described mechanism;

A rod 27 is provided, which is received within the hub members 23 of the bearing member 20 and within the hub member 24 of the bearing member 19. Beveled gears 28 and 29 are provided on the rod 18 and are held in place by the set screws 30. A beveled gear 31 is mounted on the operating rod 13 and held in place by means of the set screws 30. The beveled gear 31 is in mesh with the beveled gear 28 on the rod 27. The beveled gear is held firmly against the bearing member 21, which prevents movement in one direction, and the beveled gear 28 prevents movement of the beveled gear 31 in the other direction.

Fixed on the shaft 13 is a beveled gear 32, which is held in place by the set screw 30. The beveled gear 32 is in mesh with the beveled gear 29.

It will be seen that by rotating the rod 13 that the rod 16 will be operated in the same direction, thus moving the front and rear signal members 14 and 17 in unison with each other.

It will be understood that the entire bearing 20 and the beveled gear 31 may be slid longitudinally on the rod 13, while the bearing member 19 may be slid longitudinally with the gear 32, on the rod 16. By providing the bearing members, 19 and 20 capable of longitudinal movement, I am able to adjust the parts so as to successfully operate upon various types of automobiles and can move the bearing members together with the beveled gears to any desired position, so as to transmit movement from the rod 13 to the rod 16.

In this way, if there is any projections on the automobile engine that will interfere with the rod 27, the entire driving mechanism from the rod 13 to the rod 16 may be slid longitudinally and moved to any desired position, substantially as is illustrated in Fig. 1 in dotted lines.

When the beveled gear 31 is fixed on the operating rod 13, it locks the entire bearing member against movement in any direction. After the bearing member 20 has been fixed or determined, then the bearing member 19 may be fixed to the frame of the automobile on any permanent part of the frame.

In Fig. 5 of the drawings, I have shown the rod 13 made of flexible material, so as to permit curving it to various desired positions, so that it will operate under practically any circumstances.

In Fig. 6 of the drawings, I have shown the universal joints 33 and 34 for accomplishing the same purpose.

Fixed on the dash 12 adjacent to the handle 15 is the dial member 35, which is fixed onto the housing 36 on the dash 12. The housing 36 is held in position by the screws 37. Received within the housing 36 and on the rod 13 is the coil spring 38, which rests against the handle 15, the purpose of which will be hereafter more fully described.

On the rod 13 adjacent to the inner side of the dash 12, I provide a pin or stop device 39. The coil spring 38 tends to force the operating rod inwardly, thus causing the pin 39, which extends through the rod 13 to rest against the inner side of the dash 12.

The friction of the pin 39 resting against the dash 12 will cause the signal members to remain in any position desired. Fixed on the rod 13 and adjacent to the dial 35 is the indicator 40. The dial is provided with any suitable inscriptions indicating the direction that it is desired to have the signal members rotate; as for example "Left" or "Right" or any other such signals, as are ordinarily given by the drivers of motor vehicles.

When the operator desires to cause the signal members to move, he engages the handle member 15, moving it slightly forward, so as to relieve the frictional engagement of the pin 39 from the dash 12, thus permitting easy free rotation of the operating rod 13, which in turn imparts movement to the signal members 14 and 17.

The advantages of my device reside in the fact that I am able to install my signal device upon cars of various sizes and types by simply sliding the bearing members 19 and 20 until a suitable place is found on the car as to where to transmit motion from the rod 13 to the rod 16.

The simplicity of the bearing member 20 and the fact that it is practically free to move on the rod 13 and yet when the set screw 30 on the beveled gear 31 is placed in position, the bearing member and the beveled gears are all locked in position. The bearing member 19 is also capable of longitudinal movement on the rod 16, thus rendering my device of simple construction and yet adaptable to various conditions of various cars.

Some changes may be made in the arrangement, construction and combination of the various parts of my device without departing from the essential features and purposes of my invention, and it is my intention to cover by my claims any modified forms of structure or use of mechanical equivalents, which may be reasonably included within their scope.

I claim as my invention:

1. A signal device for vehicles comprising a pair of substantially parallel rods, signal devices on the opposite ends of said rods, a bearing device on one of said rods having alined journals and a journal at right angles to said alined journals, one of said shafts being mounted in said alined journals for permitting the sliding and rotary movement of the shaft, a bearing device having alined journals receiving the second shaft and having a third journal at right angles to the second shaft, a shaft slidably and rotatably mounted in the last mentioned journal of each bearing device, a gearing detachably fixed on the first of said pair of shafts adjacent to one of said bearings, a gearing detachably fixed on the second of said shafts adjacent to one of the alined bearings thereof, gearings detachably fixed on the third shaft in mesh respectively with the first described gearings.

2. In combination with an automobile, a shaft rotatably mounted at two points on said automobile, a second shaft substantially parallel with the first shaft rotatably mounted on the automobile at one point, a bearing device having alined journals for said first shaft and a journal arranged substantially at right angles to said first shaft, a bearing device having alined journals receiving said second shaft and having a journal substantially at right angles to said second shaft, a shaft slidably and rotatably mounted in the third journal of each bearing device, a gearing member detachably fixed on said first shaft adjacent to one of the alined bearings therefor, a gearing member detachably fixed to said second shaft adjacent to one of the alined bearings therefor, and gearing members detachably mounted on said third shaft and meshing respectively with the first two described gearing members.

Des Moines, Iowa, July 7, 1920.

JOSEPH W. MICHAEL.